United States Patent [19]

Schrader

[11] 4,267,919

[45] May 19, 1981

[54] VIBRATING SPIRAL CONVEYOR DRIVE

[75] Inventor: Preston H. Schrader, Middletown, Ky.

[73] Assignee: Rexnord Inc., Milwaukee, Wis.

[21] Appl. No.: 41,167

[22] Filed: May 21, 1979

[51] Int. Cl.³ .......................................... B65G 27/02
[52] U.S. Cl. .................................... 198/756; 198/770
[58] Field of Search .............. 198/752, 756, 757, 770, 198/391; 74/61; 209/366.5, 367

[56] References Cited

U.S. PATENT DOCUMENTS 2,542,227  2/1951  Bernhard ............................... 74/61
2,922,309  1/1960  Adams .................................... 74/61

FOREIGN PATENT DOCUMENTS 857250  12/1960  United Kingdom .................... 74/61

Primary Examiner—Bruce H. Stoner, Jr.
Assistant Examiner—Douglas D. Watts

[57] ABSTRACT

A spiral vibrating elevator having a plurality of rotating shafts each having eccentric weights on the ends thereof wherein said eccentric weights create vertical force components which are in phase when the horizontal components are in phase. The vertical components provide the upward and downward motion while the horizontal components provide the twisting motion or torque about the central axis of the elevator.

4 Claims, 11 Drawing Figures

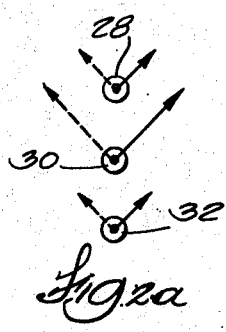 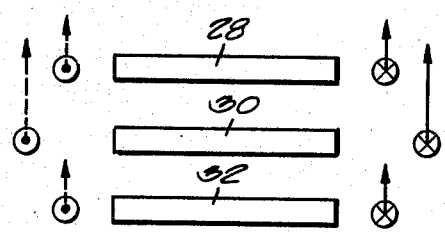 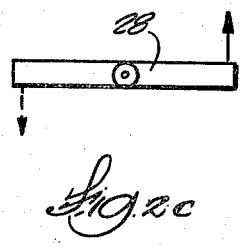
Fig.2a Fig.2b Fig.2c
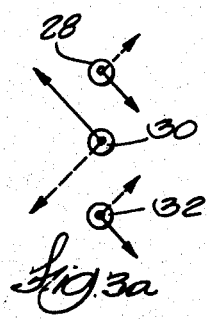 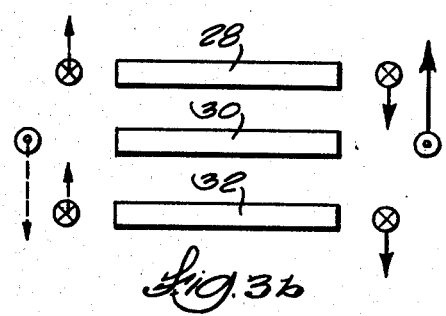 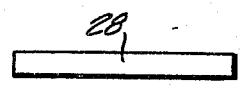
Fig.3a Fig.3b Fig.3c
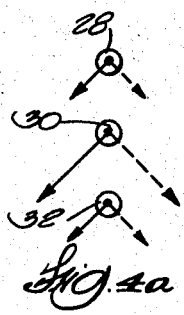 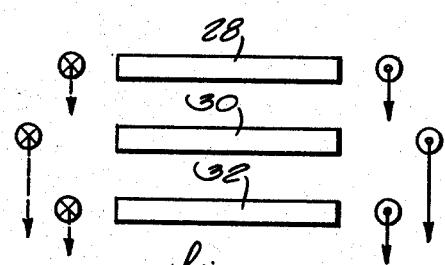 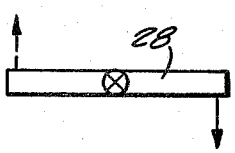
Fig.4a Fig.4b Fig.4c

4,267,919

VIBRATING SPIRAL CONVEYOR DRIVE

BACKGROUND OF THE INVENTION

1. Field of the Invention

This invention relates to vibrating conveyors and, in particular, to an improved drive mechanism suitable for use in circular and helical vibrating conveyors.

2. Discussion of the Prior Art

In contrast to movement along straight line vibrating conveyors, articles on a circular conveyor must be given a vibrating motion which causes the articles to move continuously in a circle. Thus, the motion must be both vertical and twisting in the horizontal plane. Various types of vibrating drives used with circular conveyors, particularly spiral type vibrating conveyors, may be found in the patent literature, such as in U.S. Patent Office classification 198, subclass 756. It is known, for example, to provide the desired motion with a pair of generally parallel, contra rotating shafts mounted on a helical conveyor transversely to its vertical axis with each of the shafts carrying a pair of eccentric weights. The weights are phased so that the horizontal resultant of the forces on each side of the conveyor are generally parallel to the helix. This produces the circular motion. Similarly, the vertical components are in phase. Collectively, the vertical component is upward when the horizontal component is in the direction of the helical ascendency and downward with the horizontal component is in the direction of helical descendency.

A typical helical drive of the above type is described in U.S. Pat. No. 2,927,683. A motor is connected to and drives each shaft. As the patentee states, a problem with this type of drive is that a precessional force is created and acts on the eccentric weights. The force results not only in possible shaft breakage but considerable increased load against the shaft bearings. For large helical conveyor assemblies, the load increase may become significant and affect the performance of the assembly.

It is therefore a paramount object of the present invention to provide for a drive of the type described above which reduces or eliminates thrust bearing loads in helical conveyor assemblies.

SUMMARY OF THE INVENTION

Although the invention as summarized below may be utilized in any vibratory device where it is desired to move articles circularly about a surface, it shall be described in reference to spiral or helical elevators for purposes of simplicity and clarity. Those who are acquainted with handling of materials with vibratory apparatus upon a reading of the subject matter disclosed herein will be aware of the many applications of the invention.

The above object of the invention and others may be accomplished through the use of a plurality of rotating shafts which are supported by the centrally positioned tube in a co-planar relationship. One of the shafts is positioned such that its axis passes through the center of rotation of the spiral elevator. Each shaft is provided weights at each end thereof which have a predetermined mass and angular position relative to shaft such that when the shafts are rotated the upwardly and downwardly directed components of the resultant forces created by the eccentric weights are in phase when the horizontal components are directed in the direction of ascendency and descendency of the helical conveyor trough.

Because one of the shafts and its bearings are located symmetrically about the center of rotation, the thrust bearing loads are eliminated for this shaft thereby reducing the overall affect. In one embodiment of this invention, all of the shafts have axis which intersect with the center of rotation which means the shafts are in a vertical plane. In this embodiment, all bearing thrust loads are eliminated since the shafts and weights are essentially symmetrical about the center of rotation.

BRIEF DESCRIPTION OF THE DRAWINGS

FIGS. 2a, b, and c are schematic views of the three shafts at one rotative position as seen from the end, side, and overhead with the various force vectors depicted as arrows.

FIGS. 3a, b, and c are schematic views as in FIGS. 2a, 2b, and 2c with the drafts rotated to another position.

FIGS. 4a, b, and c represent still another rotative position of the three shafts.

DETAILED DESCRIPTION OF THE PREFERRED EMBODIMENT

Figure 1:
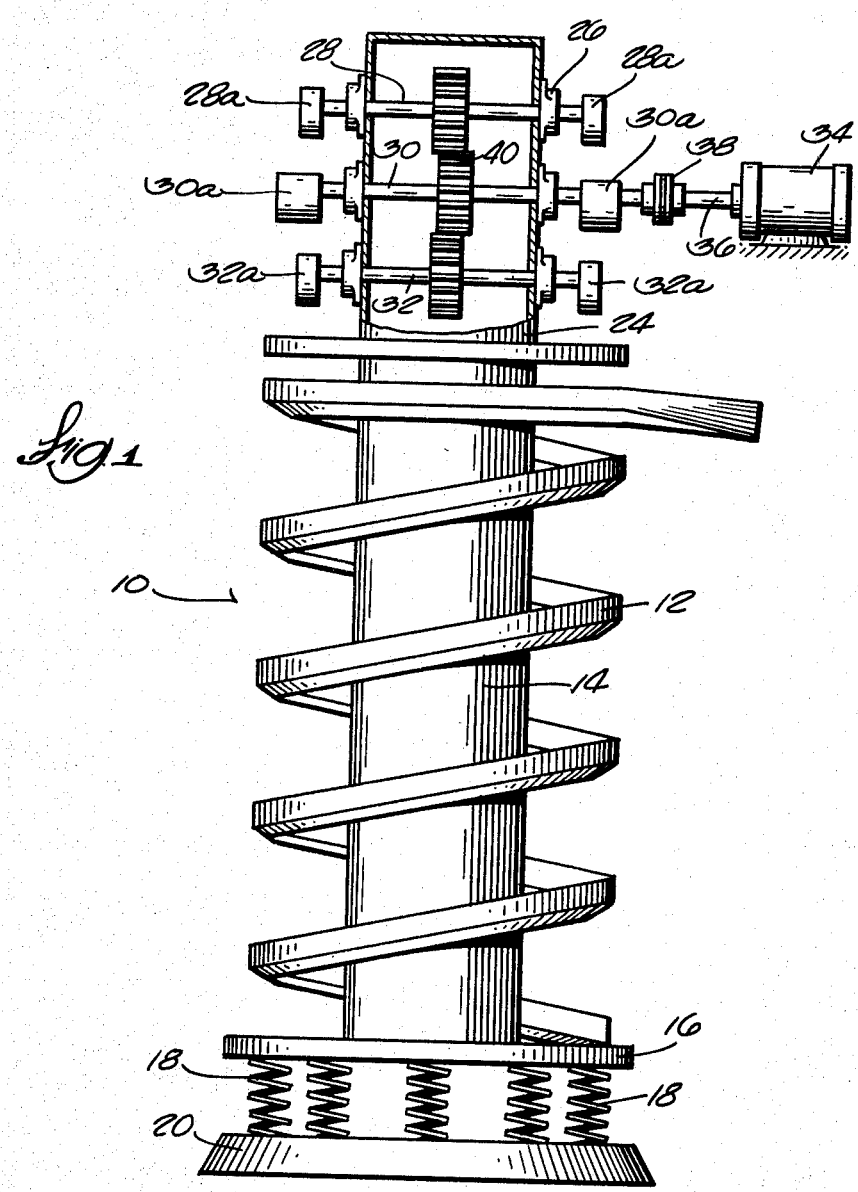
FIG. 1 is a side view of a spiral elevator employing a vibratory drive in accordance with one embodiment of the present invention.

FIG. 1 illustrates a spiral elevator empoying a vibratory drive in accordance with one embodiment of the present invention. The elevator 10 comprises a helical trough 12 which is wound about and supported by centrally located upright member such as tube 14. Supporting tube 14 is a base 16 in turn supported by a pluarlity of resilient members such as coil springs 18 resting on foundation 20. Upper base 22 itself supported by tube 14 provides in turn support for housing 24. A plurality of bearings 26 are secured to housing 24 and provide rotable support to shafts 28, 30, and 32. Shaft 30 is connected to motor 34 through universal joints 36 and splined shafts 38 or other suitable connection.

Shafts 28, 30 and 32 respectively mount eccentric weights 28a, 30a and 32a outboard of housing 24 and bearings 26. The mass moment of each weight 30a is essentially twice that of each eccentric weight 28a or 32a. As can be seen through the broken-away portion of housing 26, each shaft 28, 30, 32 carries gears 40 (or other connecting devices such as a chain or double sided timing belts) which mesh such that shaft 30 driven by motor 34 supplies counter rotation to shafts 28 and 32. Through the positioning of eccentric weights 28a, 30a and 32a, the resulting forces generated from the rotation of the unbalanced weights produce the desired helical vibratory motion of elevator 10.

To better visualize the relative positioning of the eccentric weights on the shafts and forces produced, reference is made to the schematic diagrams of FIGS. 2, 3 and 4 which depict rotation of shafts 28, 30, 32 through three phases 90° apart. The dashed vectors represent forces generated by weights at one end of the shafts and while the solid vectors depict the forces generated by the weights positioned at the other end. Looking at an end view of the shafts, the dotted vectors represent the weights at the remote ends. Because the masses on shaft 30 are twice as large as those on shafts 28 or 32, and shaft rotation is essentially at the same angular speed, the vectors depicting the force vector generated by the weights on shaft 30 are twice as long as those vectors representing forces generated by the weights on shafts 28 or 32. The horizontal components in FIGS. 2b, 3b, 4b are depicted by the dots and an "X" inscribed inside the circles. The dots represent the force vector directed out of the paper while the "X" represents a force vector directed into the paper. The weights on one end of each shaft may be positioned as illustrated at a 90° angle with respect to the weight on the other end. It should be noted that while it is necessary that the weights have the same angle with respect to the horizontal plane, the exact angle employed is a matter of choice.

As shaft 30 is rotated, shafts 28 and 32 are rotated at essentially the same angular speed but in the opposite direction. As seen in FIG. 2b, the vertical components of all the forces are in the same direction, thus the resultant vertical component is upward. At the same time, the horizontal components of all the forces represented by the dashed vectors are in phase as are the forces represented by the solid vectors. As seen in FIG. 2c, the result is a twisting clock-wise motion about the vertical axis of rotation of the elevator which would be in direction of trough ascendency.

FIG. 3 represents a 90° rotation in the shafts and demonstrating the cancelling of the forces. FIG. 4 illustrates a further 90° rotation in which the vertical and horizontal forces are again in phase with the vertical component being downward and the horizontal component providing counter-clockwise motion to the elevator. This combination of vertical and circular motion results in the desired helical motion of elevator 11.

One of the advantages to the embodiment of the present invention illustrated in FIG. 1 is the positioning of the shafts such that each passes through the center of rotation of the elevators. Problems with bearing thrust loads are virtually eliminated since the shafts and eccentric weights are symmetrical about the center of rotation of the elevator. Additionally, one-half of the power in-put is absorbed directly by shaft 30.

Figure 5:
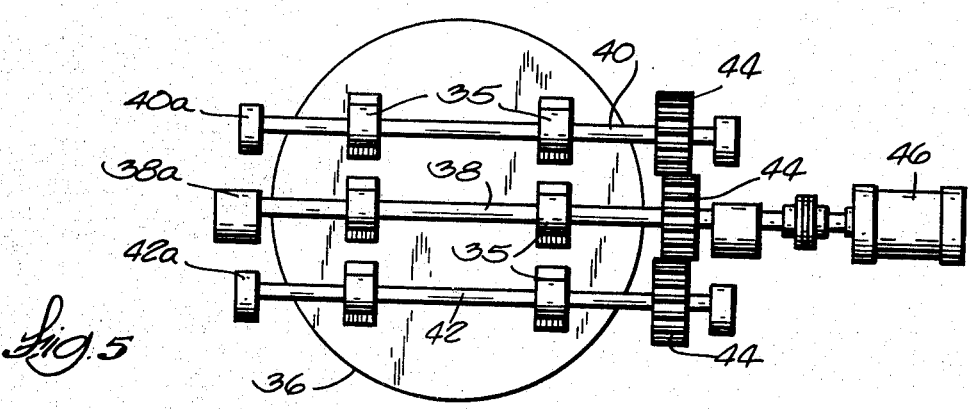
FIG. 5 is a plan view of another embodiment of the present invention.

FIG. 5 depicts another embodiment of the present invention. As seen from the top, a plurality of shafts are rotatably mounted by bearings 35 to an upper base 36 of spiral elevator. The shafts are all positioned in a horizontal plane. The center shaft 38 passes through the center of rotation of the spiral elevator and is coupled to a motor 46. Each shaft has a pair of eccentric weights, each weight being mounted near an end of its respective shaft. Shaft 38 through meshing gears 44 drives shafts 40, 42 at essentially the same speed but in the opposite directions. As before, the eccentric weights on shaft 38 have essentially twice the mass moment as corresponding eccentric weights on shafts 40 or 42. The weights are positioned at angles sufficient to provide an in-phase relationship upon each 180° rotation of the shafts. Thus, the desired helical motion is again supplied as the shafts rotate.

Unlike the embodiment illustrated in FIG. 1, shafts 40 and 42 and weights are not symmetrical about the center of rotation. Thrust loads are experienced by bearings 35, but because the mass of eccentric weight 38a carried by shaft 38 is twice the weight 40a or 42a carried by outboard shafts 40, 42, the total thrust force experienced by shafts 40, 42 may be made less than that of a similar two shaft arrangement.

It will be evident to those skilled in the art after a reading of the detailed description that various modifications and variations are possible without departing from the scope of the appended claims.

I claim:

1. An improved circular conveyor having a base, a plurality of resilient members attached to the base, carrier means supported by said resilient members, and drive means for imparting vibrating motion to said carrier such that the articles carried thereon are imparted a circular motion, said improvement comprising
   (a) a plurality of co-planar shafts mounted in a vertical plane rotably associated with said carrier, and positioned transverse to the verticl axis of said circular conveyor with one of said shafts essentially intersecting said vertical axis,
   (b) means for driving at least one of said shafts at a predetermined angular speed,
   (c) coupling means for coupling said one shaft to the other of said shafts so that all shafts rotate at essentially the same predetermined angular speed, and
   (d) a pair of eccentric weights mounted on each shaft, each weight of a pair mounted near an end of its respective shaft, said pairs being angularly displaced with each other such that the vertically directed components of the resultant forces caused by the rotating eccentric weights are in phase when the horizontal components are in phase.

2. The circular conveyor of claim 1 in which the carrier means is a trough helically wound about and supported by an upright centrally positioned tube.

3. The conveyor of claim 2 having a plurality of shafts in which said one shaft has a rotation in the opposite direction from the other shafts, the weights on said one shaft having a mass moment twice that of the corresponding weights on the other shafts.

4. The elevator of claim 3 in which the center shafts is coupled to a power means for rotation and is operatively associated with said other shafts and imparts counter-rotation thereto.

* * * * *